United States Patent [19]

Miller et al.

[11] 3,739,270
[45] June 12, 1973

[54] ELECTRONIC SPEEDOMETER/ODOMETER WITH INTERCHANGEABLE CALIBRATING MEANS FOR ACCOMMODATING A PLURALITY OF VEHICLE TIRE SIZES

[75] Inventors: Roger L. Miller, Ann Arbor; Robert S. Podlewski, Jackson, both of Mich.

[73] Assignee: Kelsey Hayes Company, Romulus, Mich.

[22] Filed: Feb. 1, 1971

[21] Appl. No.: 111,399

[52] U.S. Cl. .............................. 324/166, 324/171
[51] Int. Cl. ............................................. G01p 3/54
[58] Field of Search ................ 324/168, 171, 166, 324/173, 174, 175; 73/2

[56] References Cited
UNITED STATES PATENTS

| | | | |
|---|---|---|---|
| 3,358,230 | 12/1967 | Wiley | 324/171 |
| 3,477,022 | 11/1969 | LeMasters | 324/171 |
| 3,441,943 | 4/1969 | McCue | 324/71 |

FOREIGN PATENTS OR APPLICATIONS

968,008  8/1964  Great Britain ...................... 324/171

*Primary Examiner*—Michael J. Lynch
*Attorney*—Harness, Dickey & Pierce

[57] ABSTRACT

This invention relates to an electronic speedometer/odometer responsive to pulses from a wheel speed sensor which may include a speedometer circuit and an ammeter for indicating speed with provision for interchangeably inserting calibrating resistors in the meter circuit for establishing a meter response in accordance with the vehicle tire size, and an odometer programmable circuit connected to an odometer with provision for interchangeably inserting program circuits for establishing the response of the odometer selected in accordance with the vehicle tire size. Preferably, the meter calibration resistor and the odometer program circuit are mounted in a single interchangeable unit.

18 Claims, 6 Drawing Figures

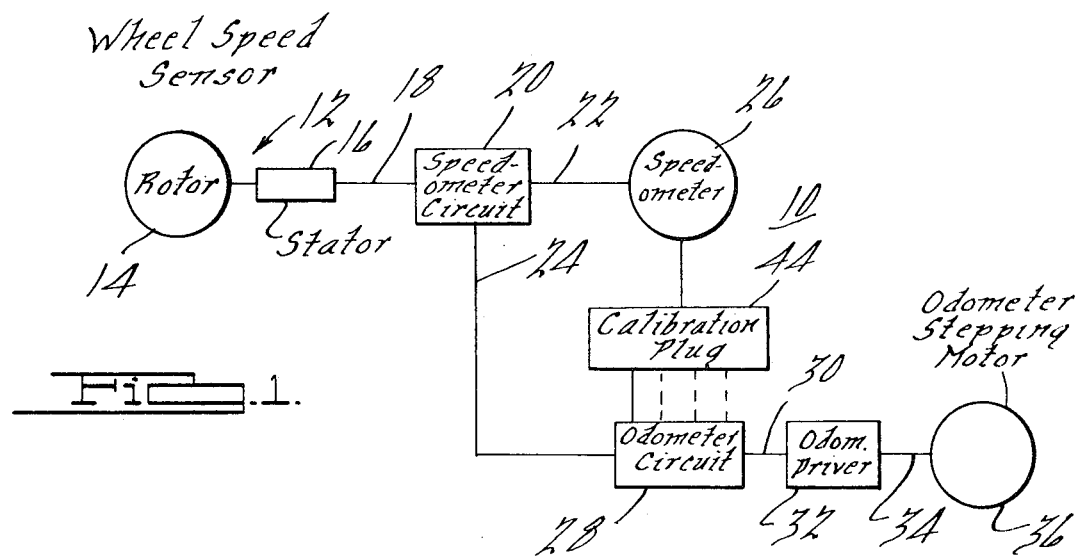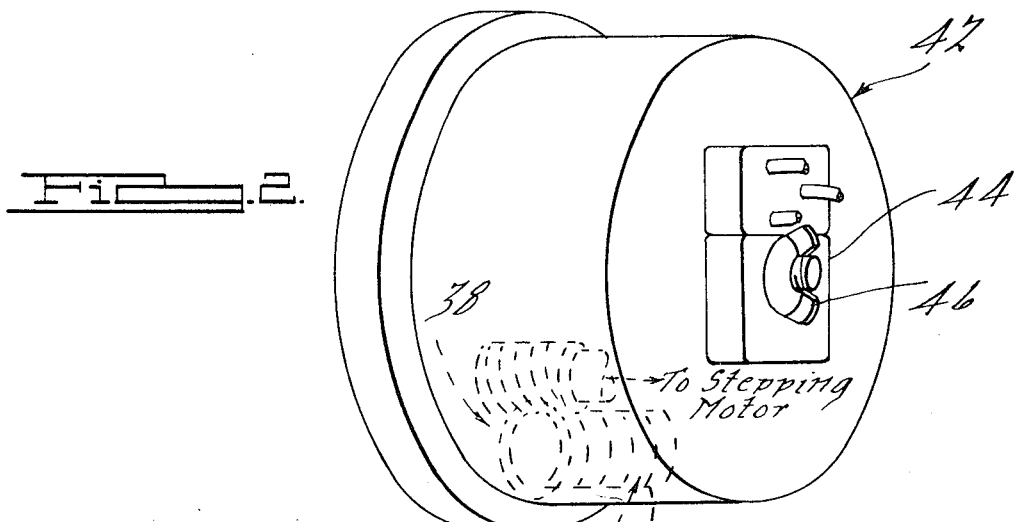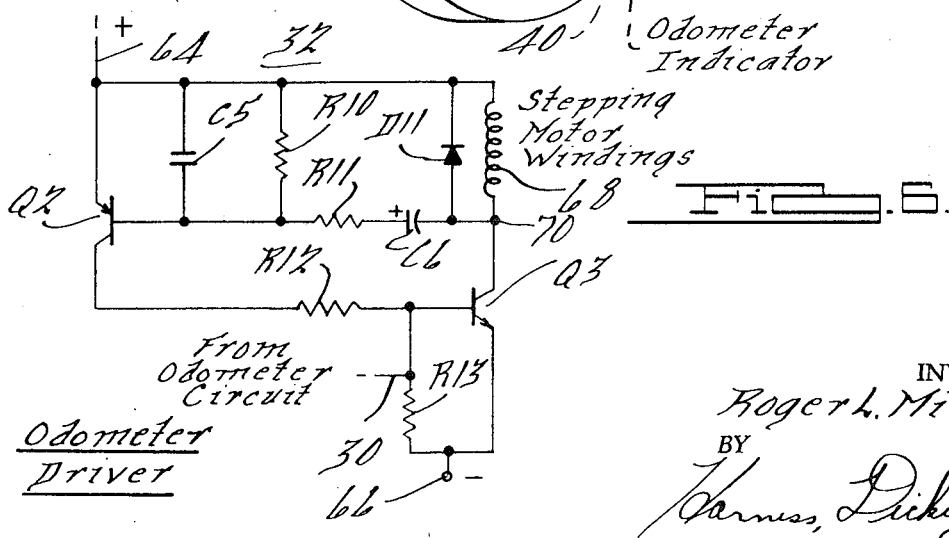

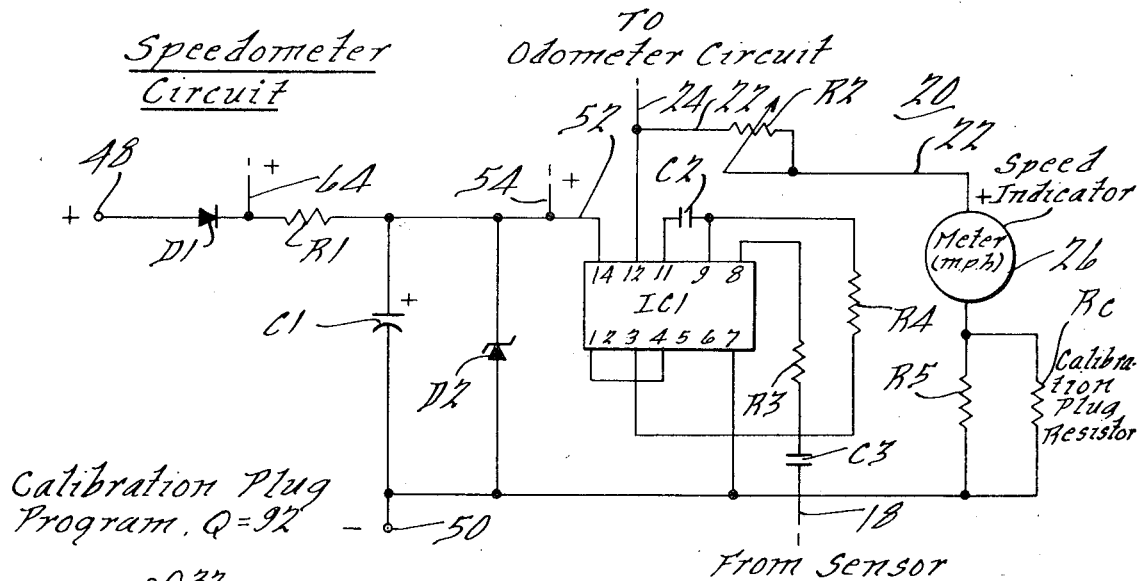
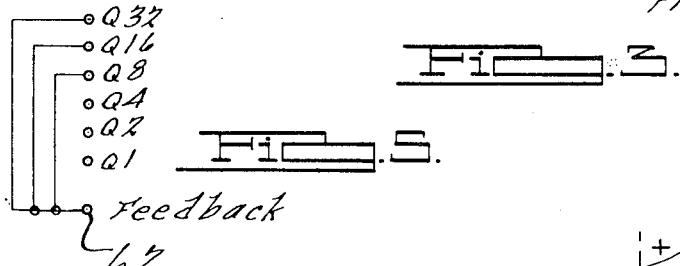
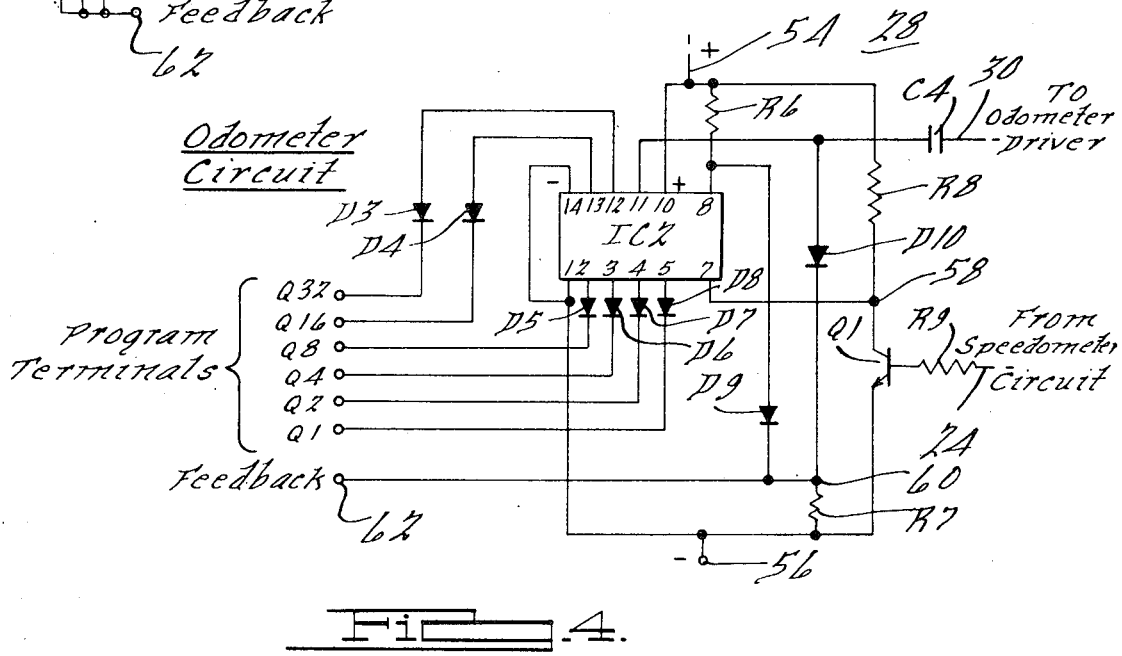

ELECTRONIC SPEEDOMETER/ODOMETER WITH INTERCHANGEABLE CALIBRATING MEANS FOR ACCOMMODATING A PLURALITY OF VEHICLE TIRE SIZES

BACKGROUND AND SUMMARY OF THE INVENTION

The trucking industry uses a substantial range of tire sizes on their vehicles to meet the special requirements of that industry. By way of example, the tire sizes used by the trucking industry may vary so as to provide from 460 wheel revolutions per mile to 630 wheel revolutions per mile.

The present invention provides a speedometer/odometer which can accomodate a wide range of tire sizes using only a single basic apparatus which is calibrated in accordance with a particular tire size by an interchangeable unit. In general, the speedometer/odometer of this invention is responsive to a wheel speed sensor and includes an indicator for providing an indication of vehicle velocity and/or accumulated distance traveled by the vehicle in combination with a calibration unit for affecting the indication in accordance with the tire size of the vehicle. An exemplary embodiment of speedometer/odometer according to the present invention utilizes a speedometer circuit, preferably an integrated circuit, which receives pulses from a wheel speed sensor and provides an output signal having an average current level indicative of the number of pulses generated by the wheel speed sensor per unit time which is received by an ammeter. Terminal means are provided in the meter circuit for insertion of a resistor of selected resistance value, or no resistor at all, to calibrate the meter in accordance with the tire diameter. The speedometer/odometer is also provided with an odometer circuit which may receive either the pulses from the wheel speed sensor or the output signal of the speedometer circuit to provide a signal representative of the distance traveled by the vehicle. The odometer circuit has means for selectively programming the circuit so as to control its output signal with respect to a given input signal so that it provides a signal in accordance with the actual distance traveled by the vehicle. The output signal of the odometer is received by an operatively associated odometer to accumulatively register the distance traveled by the vehicle. More specifically, the odometer circuit may be a programmable integrated circuit which receives pulses from the speedometer circuit and divides those pulses by a divisor in accordance with the tire size of the vehicle to yield output pulses which are reduced in number. The divisor is established by a program circuit which is interchangeably connectable to the odometer circuit. The output pulses of the odometer circuit may be received by an odometer driver for driving a stepping motor which in turn operates an odometer register through a reduction gear. Preferably, both the resistor for calibrating the speedometer circuit and the program circuit for establishing the divisor of the odometer circuit are mounted in a single detachable and interchangeable plug-in unit which can be connected to the speedometer/odometer assembly after the construction of the assembly.

In view of the foregoing description of an exemplary speedometer/odometer assembly according to this invention, it will be appreciated that only a single basic speedometer/odometer unit need be designed and constructed for a wide variety of vehicle applications thereby simplifying the manufacturing and inventory requirements for supplying the trucking industry with speedometer/odometer units. Moreover, the speedometer/odometer units of this invention are capable of relatively fine matching to a vehicle application and consequently, a high level of accuracy is achieved.

BRIEF DESCRIPTION OF THE DRAWINGS

FIG. 1 is a block diagram of an exemplary speedometer/odometer apparatus according to this invention;

FIG. 2 is a perspective illustration of the rear portion of a housing for an exemplary speedometer/odometer apparatus according to this invention showing a calibration plug;

FIG. 3 is a circuit diagram of a portion of the speedometer circuit of FIG. 1 including a wheel speed sensor, a speedometer circuit, a speed indicating meter, and a calibration resistor for the speedometer circuit;

FIG. 4 is a circuit diagram of another portion of the speedometer circuit of FIG. 1 including an odometer circuit with programming circuit terminals;

FIG. 5 is a circuit diagram of an exemplary programming circuit for the odometer circuit of FIG. 4; and FIG. 6 is a circuit diagram yet another portion of the speedometer/odometer circuit of FIG. 1 including an odometer stepping motor driving circuit.

DETAILED DESCRIPTION OF THE PREFERRED EMBODIMENT

In FIG. 1, a schematic diagram of an exemplary speedometer/odometer 10 is illustrated. The speedometer/odometer 10 operates in conjunction with a wheel speed sensor 12, which may be one of the wheel speed sensors of a brake antiskid system, consisting of a rotor 14 and a stator 16. Wheel speed sensors of this type are well known to the art and therefore a detailed description thereof will not be provided. By way of example, the wheel speed sensor 12 may provide 120 electrical pulses for each wheel revolution on an output line 18. Consequently, with appropriate calibration, the number of pulses may be made representative of the distance traveled by a vehicle whereas the rate of pulse generation may be made representative of the speed of the vehicle. The pulses along line 18 are transformed by a speedometer circuit 20 into corresponding pulses of predetermined constant width and amplitude appearing at output lines 22 and 24. The pulses on output line 22 are received by a speedometer meter 26 which may be a milliammeter which measures the average current level on line 22, and consequently, the rate of repetition of the pulses on line 22. An odometer circuit 28 receives the train of regulated pulses from the speedometer circuit 20 on line 24 and divides those pulses by a predetermined divisor to yield a numerically reduced train of pulses on line 30. The pulses on line 30 are delivered to an odometer driver 32 which provides an output signal on line 34 of sufficient strength to drive a stepping motor 36 which is mechanically coupled through a reduction gear 38 to an odometer indicator 40 within a housing 42 for the speedometer/odometer 10 as seen in FIG. 2. The speedometer 26 and the odometer circuit 28 are calibrated for different tire sizes using a plug-in calibration unit 44 which can be seen attached to the back of the speedometer/odometer housing 42 by a wing nut 46 as shown in FIG. 2. To this end, the housing 42 carries terminals which correspond to terminals on the calibration unit 44 which may be of any appropriate type.

In FIG. 3, an exemplary embodiment of a speedometer circuit 20 is shown. The speedometer circuit 20 receives battery positive terminal voltage at a supply terminal 48. It is further connected to the negative terminal of the battery at a terminal 50. The input circuit has a diode D1 is connected to the supply terminal 48 to prevent the destruction of the circuit in the event of a reverse polarity connection, a resistor R1 for current limiting a filter capacitor C1, and a voltage regulating a zener diode D2 so as to provide a filtered regulated voltage on a line 52. The regulated voltage is delivered to a supply terminal 14 of a first integrated circuit IC1 (herein, underlined terminals designate IC terminals). The integrated circuit IC1 may be a model SW780 manufactured by Stewart-Warner Microcircuits, Inc., 730 E. Evelyn Avenue, Sunnydale, California. The terminals are numbered on IC1 in FIG. 3 in accordance with the standard numbering practice for the above Model SW780.

The input train of pulses on line 18 from the sensor 12 is delivered through a DC blocking capacitor C3 and a current limiting resistor R3 to an input terminal 8 of IC1. The IC1 is provided with a timing capacitor C2 connected between its terminals 9 and 11 and pulse-width establishing resistor R4 connected between its terminals 9 and 3. Additionally, terminals 1 and 4 are interconnected in accordance with the standard practice recommended by the manufacturer for the above integrated circuit. The integrated circuit IC1 provides output pulses at terminal 12 corresponding with the input pulses on line 18 which are received by lines 22 and 24. The output pulses have preselected constant widths and amplitudes. Line 22 has a resistor R2 for initial calibration of the meter 26 at the time of assembly. The line 22 is connected to the speedometer meter 26 which may be a milliammeter having a zero to 1 milliampere rating. The meter circuit is completed through a resistor R5, and under selected conditions, through a calibration resistor RC which is connected in parallel with the resistor R5 between the meter 26 and negative battery potential at terminal 50. It can be seen that the resistors R5 and RC determine the current flow through the meter 26, and accordingly, establish the amplitude of the response of the meter 26 to the pulse rate from the wheel speed sensor 12.

The meter reading of the speedometer meter 26 is established in accordance with wheel size by the provision of the calibration resistor RC, preferably carried by the calibration plug 44. In this regard, it will be appreciated that smaller wheel sizes have a greater number of rotations per mile, and accordingly, the resistance of the calibration resistor RC is selected to be relatively larger. For the smallest wheel sizes, the resistor R5 which is in parallel with the calibration resistor RC may be established so that the speedometer 26 is correctly calibrated. For increasing wheel sizes calibration resistors RC of decreasing resistance values are inserted in parallel with resistor R5 so as to increase the sensitivity of the speedometer meter 26.

In FIG. 4, a circuit diagram of an odometer circuit 28 is illustrated. The odometer circuit 28 receives pulses from the speedometer circuit 20 on line 24 at the base of a transistor Q1 through a current limiting resistor R9. The input of an integrated circuit IC2 is connected to the collector of the transistor Q1 at terminal 58. The terminal 58 is maintained near positive potential when the transistor Q1 is non-conductive and is pulled down to near negative battery potential when the transistor Q1 is conductive to deliver a pulse to the input of IC1 upon each pulse received at the base of the transistor Q1. To this end, a resistor R8 is connected between the positive supply conductor 54 and the terminal 58 to provide a voltage drop from positive supply potential when the transistor Q1 conducts. The integrated circuit IC2 may be a HCTR0507 (HRM2034), seven-stage programmable counter manufactured by the Newport Beach Division of the Hughes Aircraft Company, Newport Beach, California. Using the nomenclature for the aforementioned HCTR0507 (HRM2034), the IC2 has, in the counterclockwise direction, an input terminal 7 connected to the collector of transistor Q1 at 58, a reset terminal 8, a positive supply terminal 10 connected to regulated supply voltage line 54, a divisor terminal 11 representing a divisor of 64, a divisor terminal 12 representing a divisor of 32, a divisor terminal 13 representing a divisor of 16, negative supply terminals 14 and 1, a divisor terminal 2 representing a divisor of 8, a divisor terminal 3 representing a divisor of 4, a divisor terminal 4 representing a divisor of 2, and a divisor terminal 5 representing a divisor of 1. As can be seen in the drawing, each of the divisor terminals is provided with a gating diode indicated as D3–D8 and D10 and the reset terminal 8 is provided with a gating diode D9. The divisor terminal 11 representing a divisor of 64 is connected to one terminal 60 of a resistor R7. The other terminal of the resistor R7 is connected to the negative battery voltage terminal 56. The reset terminal 8 is also connected through its associated gating diode D9 to the terminal 60. The aforementioned IC2 is operative such that the device will count while the terminal 8 is maintained at a predetermined positive level and will reset when terminal 8 goes negative. Consequently, a positive potential maintained at terminal 60 will establish a counting condition in the integrated circuit IC2 whereas a negative potential impressed on the terminal 60 will restart the counting sequence of the integrated circuit IC2. The potential at the terminal 60 is controlled between the operative positive and negative levels in accordance with the programming established for the integrated circuit IC2.

The divisor terminals 5–2 and 13–12 representing the divisors 1, 2, 4, 8, 16 and 32 are connected through the respective gating diodes to corresponding programming terminals Q1, Q2, Q4, Q8, Q16 and Q32. A feedback terminal 62 is also provided which is connected to the terminal 60 of the resistor R7. The programming terminals and the feedback terminal 62 are accessible for connection to the calibration plug 44.

In the operation of the integrated circuit IC2, each of the divisor terminals initially are positive until the number of pulses received at the input terminal equals the respective divisor number for the divisor terminal at which time the divisor terminal will go negative for a like number of pulses, and again positive for a like number in sequence. Presuming that the odometer circuit 28, as shown in FIG. 4 without any connections at the programming terminals, has been reset by a negative pulse at the reset terminal 8, and thereafter, pulses are supplied to the input terminal 7 from terminal 58, terminal 11 representative of the divisor 64 will remain positive until the sixty-fourth pulse is received at the input terminal 7 at which time terminal 11 will go negative pulling down terminal 60 so as to correspondingly pull down the reset terminal 8 through the gating diode D9 to reset the integrated circuit IC2. Accordingly, the countup to 64 will begin anew. Since the remaining divisor terminals are not connected to terminal 60 as shown in FIG. 4, they do not effect the resetting of IC2. If, for example, the program terminals are connected to the feedback terminal 62 in a manner shown in FIG. 5, the count required to reset the integrated circuit IC2 will be changed accordingly. With reference now to FIG. 5 in which a circuit diagram is shown of an exemplary programming circuit for the calibration plug shown in FIG. 1, it can be seen that program terminals Q16, Q8, and Q4 are connected to the feedback terminal 62 to provide a combined programmed divisor of 92. With that programming arrangement, 92 input pulses at input terminal 7 are required before all of the divisor terminals connected through the terminal 60 fall to the lower potential so as to reset IC2 at terminal 8. More particularly, terminal 11 representative of the divisor 64 will drop to the lower potential after 64 input pulses at which time programming terminals Q16, Q8 and Q4 will all be at positive potential because of their numerical relationship with 64. It will be appreciated that during the initial count up to 64, program terminal Q16 has cycled twice through high potential and low potential values, programming terminal Q8 has cycled four times, and programming terminal Q4 has cycled eight times. After an additional 16 input pulses, the programming terminal Q16 will go negative, however, the terminal 60 will remain positive since Q8 and Q4 are not positive. After additional 8 input pulses, Q8 will go negative but the terminal 60 will still remain positive since Q4 has become positive. After a still additional four input pulses, a total of 92 input pulses, Q4 will go negative at which time all of the divisor terminals connected to terminal 60 will be negative so as to allow the reset terminal 8 to go negative to reset the device. If desired, divisor terminal 11 representative of divisor 64 may be brought out to the program terminals and likewise programmed, however, for most applications a minimum divisor of 64 will be required. When the integrated circuit IC2 is reset, terminal 11 representative of divisor 64 goes positive which produces a pulse at a coupling capacitor C4 which is connected to terminal 11. The pulse from capacitor C4 is transmitted to the odometer driver 32 on line 30.

It will be understood that the above integrated circuit IC2 is but one example of known programmable circuits, some using differing program and operational schemes, which may be suitably used in the speedometer/odometer of this invention.

With reference now to FIG. 6, an exemplary odometer driver circuit 32 is illustrated. The odometer driver circuit 32 is connected to a source of unregulated positive potential by a line 64, also illustrated in FIG. 3. It is also connected to the negative terminal battery voltage through terminal 66. The odometer driver 32 receives the output pulses of the odometer circuit 28 on line 30 at the base of transistor Q3 such that transistor Q3 is turned on each time a pulse is received from line 30. The collector-emitter circuit of transistor Q3 is connected in series with the winding 68 of the stepping motor 36 for energizing the windings when Q3 is on. The collector of Q3 is connected at point 70 to a capacitor C6 which is in turn connected to the base of a transistor Q2 through a resistor R11. A capacitor C5 and a resistor R10 is connected between the emitter and base of the transistor Q2 while the collector is connected to negative battery potential through a voltage divider consisting of resistors R12 and R13 which has its midpoint connected to the base of transistor Q3. When transistor Q3 is turned on, point 70 is pulled down to near negative battery potential. Since the charge across the capacitor C6 cannot change instantaneously, the opposite terminal of capacitor C6 is also brought down to near the negative battery potential. Accordingly, a voltage drop occurs through the resistors R10 and R11 which lowers a potential at the base of the transistor Q2 to turn transistor Q2 on thereby connecting the positive supply potential to the base of the transistor Q3 through the emitter-collector circuit of transistor Q2 and resistor R12 to hold the transistor Q3 on after the input pulse from the odometer circuit 28 on line 30 dissipates. As the capacitor C6 charges, the potential at the base of transistor Q2 will rise until transistor Q2 turns off turning off transistor Q3. The elapsed time between turning on of the transistor Q3 and the turning off of the transistor Q3 by the transistor Q2 is determined by the time constant established by the capacitor C6 and the resistors R10 and R11. The transistor Q3 remains in conduction for a sufficient time to allow the stepping motor 36 to rotate through one increment. A diode D11 is connected across the winding 68 of the stepping motor to prevent negative transients when the stepping motor 36 turns off. The stepping motor, as previously stated, is connected to an odometer dial through a mechanical reduction gear arrangement.

By way of illustration, if a wheel speed sensor providing 120 pulses per wheel revolution is used in combination with a stepping motor and reduction gear assembly providing a mechanical reduction ratio of 600 to 1 on a vehicle having a tire size providing 504 revolutions per mile, a divisor of 92 input pulses per output pulses will provide an appropriate overall ratio.

In view of the foregoing description, it will be appreciated that a speedometer/odometer combination is provided which is ideally suited for use where a wide variety of tire sizes must be accomodated such as in the trucking industry. The present invention enables only one basic speedometer/odometer unit to be designed, manufactured and stocked while the variations to accomodate different tire sizes are provided in the form of a calibration plug which is relatively simple and inexpensive to manufacture since it contains only a single resistor and a small number of connecting or patching lines. Accordingly, these plugs can be stocked with a minimum amount of inventory dollar value and space giving a wide range of flexibility to the use of the speedometer/odometer units according to this invention.

While it will be apparent that the teachings herein are well calculated to each one skilled in the art the method of making preferred embodiment of this invention, it will be appreciated that the invention is susceptible to modification, variation and change without departing from the proper scope of meaning of the subjoined claims.

What is claimed is:

1. For a vehicle having a wheel with a tire of a predetermined size and a sensor providing a signal having a frequency representative of the rate of rotation of the vehicle wheel; an apparatus for indicating vehicle speed and the distance traveled by the vehicle comprising:

speed indicating means responsive to said sensor signal for providing a speed indication;

odometer means including frequency dividing circuit means responsive to said sensor signal for providing an output signal having a frequency representative of said sensor signal frequency divided by a quotient, said odometer means utilizing said dividing circuit means to provide an indication of the distance traveled by the vehicle; and Calibrating means receiving means operatively associated with each of said speed indicating means and said odometer means; and unitary calibrating means being interchangeably received by said calibrating means receiving means for calibrating both said speed indicating means and said odometer means in accordance with said predetermined tire size, said unitary calibrating means including speedometer calibrating means for establishing the responsiveness of said speed indicating means to said sensor signal and odometer calibrating means for changing said quotient of said frequency dividing circuit means.

2. An apparatus according to claim 1 wherein said speed indicating means and said odometer means responds to an electrical signal from the sensor representative of the rotation of said vehicle wheel.

3. An apparatus according to claim 2 wherein said speed indicating means and said odometer means responds to a predetermined number of electrical pulses from the sensor for each rotation of said vehicle wheel.

4. An apparatus according to claim 1 wherein said speedometer calibrating means includes a resistor adapted to establish the responsiveness of said speed indicating means to said sensor signal.

5. An apparatus according to claim 4 wherein said speed indicating means is a meter and said resistor is in a circuit for said meter establishing the responsiveness thereof.

6. An apparatus according to claim 1 wherein said odometer calibrating means includes a circuit program for said odometer means.

7. An apparatus according to claim 6 wherein said circuit program is in the form of a circuit having conductors for establishing preselected circuit connections with said calibrating means receiving means for establishing said quotient of said dividing circuit means.

8. An apparatus according to claim 1 wherein said dividing circuit means is programmable to establish said quotient in accordance with the size of said tire.

9. An apparatus according to claim 8 wherein said odometer calibrating means is a program in the form of a circuit having conductors for establishing preselected circuit connections adapted to be operationally cooperative with said dividing circuit means for establishing said quotient.

10. An apparatus according to claim 9 wherein said odometer means further includes a stepping motor for providing said odometer indication in accordance with said dividing circuit means output signal.

11. An apparatus according to claim 10 wherein said odometer means includes driving circuit means receiving said dividing circuit means output signal for providing electrical pulses to said stepping motor means which provide one rotational step of said stepping motor upon one output pulse of said driving circuit means.

12. For a vehicle having a wheel with a tire of a predetermined size; an apparatus for indicating vehicle speed and the distance traveled by the vehicle comprising:

a sensor providing a predetermined number of pulses for each rotation of the vehicle wheel regardless of tire size so that the frequency of said signal is representative of the rate of rotation of the vehicle wheel;

speed indicating means responsive to said sensor signal for providing a speed indication;

odometer means including frequency dividing circuit means responsive to said sensor signal for providing an output signal having a frequency representative of said sensor signal frequency divided by a quotient, said odometer means utilizing said dividing circuit means to provide an indication of the distance traveled by the vehicle, and calibrating means receiving means operatively associated with each of said speed indicating means and said odometer means; and unitary calibrating means being interchangeably received by said calibrating means receiving means for calibrating both said speed indicating means and said odometer means in accordance with said predetermined tire size, said unitary calibrating means including speedometer calibrating means for establishing the responsiveness of said speed indicating means to said sensor signal and odometer calibrating means for changing said quotient of said frequency dividing circuit means.

13. An apparatus according to claim 12 wherein said speedometer calibrating means includes a resistor adapted to establish the responsiveness of said speed indicating means to said sensor signal.

14. An apparatus according to claim 13 wherein said indicating means is a meter with said resistor in a circuit for said meter establishing the responsiveness thereof.

15. An apparatus according to claim 12 wherein said calibrating means is a program for said apparatus.

16. An apparatus according to claim 21 wherein said program is in the form of a circuit for establishing preselected circuit connections with said means operatively associated with said indicating means for establishing the responsiveness of said indicating means to said sensor signal in accordance with said program.

17. An apparatus according to claim 12 wherein said means operatively associated with said indicating means includes a circuit for receiving pulses representative of the rotation of said vehicle wheel which is adapted to provide output pulses which are representative of the input pulses divided by a divisor, said circuit being programmable to establish said divisor in accordance with the size of said tire, said indication being in accordance with said programmable circuit output pulses.

18. An apparatus according to claim 17 wherein said calibrating means is a program in the form of a circuit having preselected circuit connections adapted to be operationally cooperative with said programmable circuit for establishing said divisor.

\* \* \* \* \*